United States Patent [19]

Okamoto

[11] 4,391,970

[45] Jul. 5, 1983

[54] PROCESS FOR PREPARING COLORLESS HYDROXYL EPIHALOHYDRIN POLYMERS

[75] Inventor: Yoshihisa Okamoto, Sagamore Hills, Ohio

[73] Assignee: The B. F. Goodrich Company, Akron, Ohio

[21] Appl. No.: 375,243

[22] Filed: May 6, 1982

[51] Int. Cl.$^3$ .................... C08G 65/24; C08G 65/28; C08G 65/30
[52] U.S. Cl. .................................. 528/408; 528/409; 528/421; 528/488; 568/614
[58] Field of Search ............... 528/408, 409, 421, 488; 568/614

[56] References Cited

U.S. PATENT DOCUMENTS

| | | | |
|---|---|---|---|
| 3,850,856 | 11/1974 | Dreyfuss | 528/408 X |
| 3,850,857 | 11/1974 | Dreyfuss | 528/408 X |
| 4,067,911 | 1/1978 | Walraevens et al. | 528/614 |
| 4,072,638 | 2/1978 | Boulet et al. | 568/614 X |

*Primary Examiner*—Earl A. Nielsen
*Attorney, Agent, or Firm*—J. Hughes Powell, Jr.

[57] ABSTRACT

In a process for the polymerization of an epihalohydrin wherein the catalyst (initiator) employed is a trialkyl oxonium salt of an HMF$_6$ acid wherein M is a Group V element selected from the group consisting of phosphorus, arsenic and antimony, and the polymerization is conducted in the presence of controlled amounts of water or a polyol to obtain hydroxyl containing low molecular weight polymers, a colorless polymer is obtained when the reaction product is washed with an aqueous solution of an alkal metal carbonate.

7 Claims, No Drawings

PROCESS FOR PREPARING COLORLESS HYDROXYL EPIHALOHYDRIN POLYMERS

BACKGROUND OF THE INVENTION

U.S. Pat. No. 3,850,856 describes the preparation of hydroxyl-terminated polymers of epihalohydrins, and in particular, epichlorohydrin, by cationic polymerization thereof in the presence of water or ethylene glycol in controlled amounts employing as a polymerization catalyst or initiator, a trialkyl oxonium salt of an $HMF_6$ acid, wherein M is a Group V element selected from the group consisting of phosphorus, arsenic and antimony. Good results are obtained when epichlorohydrin was polymerized using triethyloxonium hexafluorophosphate (TEOP) as the cationic catalyst or initiator. At the end of the polymerization it is necessary to terminate polymerization and also to destroy the catalyst residue. This is normally done by treating the polymer with ammonium hydroxide. The use of ammonium hydroxide for this purpose causes several problems. One is the development of an undesirable yellow or amber color in the product. Another in a gelation problem when the polymer is reacted with an isocyanate to prepare an isocyanate-terminated prepolymer. A process to provide stable, colorless, transparent product is desired.

SUMMARY OF THE INVENTION

Heat stable, colorless hydroxyl containing polymers of epihalohydrins, such as epichlorohydrin, can be produced by the cationic polymerization thereof in the presence of water or a polyol in controlled amounts and employing as a polymerization catalyst or initiator, a trialkyl oxonium salt of an $HMF_6$ acid, wherein M is a Group V element selected from the group consisting of phosphorus, arsenic and antimony, when the polymer is washed with an aqueous solution of an alkali metal carbonate.

DETAILED DESCRIPTION

The present invention provides colorless hydroxyl-terminated polymers of low molecular weight, or of a molecular weight which results in polymeric material suitable for use as such, or which, due to its functional groups, is capable of being further reacted with di- or polyfunctional compounds to increase the molecular weight. The invention is particularly applicable to produce polymers of epihalohydrins or halo-substituted alkylene oxides, such as, epichlorohydrin, epibromohydrin, etc.

The polyols used are hydroxyl containing materials with terminal and/or pendant hydroxyl groups. Preferably the hydroxyl containing material is an aliphatic compound and the hydroxyls groups are primary and/or secondary. Alkanepolyols including alkanediols or glycols such as ethylene glycol, 1,3-propanediol, 1,4-butanediol, 1,6-hexanediol, glycerol, and the like may be used. Aliphatic diols and triols having 2 to 8 carbon atoms have good utility. Haloalkanols are also included such as chloropropanol, bromo-1-4-butanediol and the like. Polymeric hydroxyl containing materials may be used. These include hydroxyl terminated polybutadiene, polyoxytetramethylene glycols, polyoxyethylene and polyoxypropylene glycols and triols.

The amount of water or polyol can be varied within certain limits. Due to the difference in molecular weight, the amounts of water and polyol will vary. Usually, an amount of water in the range of about 0.03 part to about 5.0 parts and an amount of polyol in the range of about 0.05 part to about 20.0 parts, said parts being by weight, based on the weight of 100 parts of the monomer being polymerized, gives the desired results. That is to say, an amount of water or polyol, i.e., ethylene glycol, in the range of about 0.03 part to about 20.0 parts by weight is sufficient. However, the best results, i.e., producing a polymer having the highest average number of hydroxyl groups per polymer chain and the desired molecular weight, are achieved when the amount of water used is in the preferred range of 0.10 part to 5.0 parts by weight, based on the weight of 100 parts of monomer being polymerized, and the amount of polyol is in the preferred range of 0.16 parts to 18.0 parts by weight, based on the weight of 100 parts of monomer being polymerized.

The cationic catalyst employed is a trialkyl oxonium salt of an $HMF_6$ acid wherein M is a Group V element selected from the group consisting of phosphorus, arsenic and antimony, such acids being $HPF_6$, $HAsF_6$ and $HSbF_6$. These catalysts can be prepared in a number of ways but the most convenient and economical method is that described in U.S. Pat. No. 3,585,277, such as mixing a solution of an $HMF_6$ acid with an epoxide selected from the class consisting of the alkylene oxides and the halogen-substituted alkylene oxides and a dialkyl ether at low temperatures. The ether employed in said process determines the alkyl groups present in the oxonium salt and one will select the ether for this purpose. There may be employed any of the dialkyl ethers including such ethers where the alkyl groups are alike and those where they are dissimilar including, for example, dimethyl ether, methyl ethyl ether, diethyl ether, dipropoyl ether, ethyl propyl ether, di-n-butyl ether, di-n-amyl ether, dihexyl ether, di-2-ethylhexyl ether, etc. The use of dialkyl ethers with dissimilar alkyl groups will produce an oxonium salt in which the alkyl groups also are dissimilar. Most important, for the purposes of this invention, the oxonium salts so obtained are stable toward water, which is most surprising, since prior literature had indicated such oxonium salts to be unstable toward water.

A preferred catalyst for use in the present process is triethyloxonium hexafluorophosphate (TEOP) $((C_2H_5)_3O^+PF_6^-)$, which is an easily handled, stable crystalline salt, although the other catalysts described above work equally as well. The amount of catalyst or initiator employed will vary but in general, an amount equal to about 0.001 part by weight to about 0.10 part by weight, based on 100 parts by weight of monomer being polymerized, is satisfactory. Since it is usually desirable, for economic reasons, to maintain the catalyst level as low as possible, an amount of catalyst in the range of 0.004 part to 0.025 part by weight, based on 100 parts by weight of monomer, is preferred. The specific amount of catalyst used in any particular polymerization will depend upon the particular $HMF_6$ salt being used, the mode of polymerization, temperature of reaction, and the like.

In general, in carrying out the process of the present invention, a mass or bulk polymerization technique is employed. That is, no solvent or inert diluent is used and the catalyst is added to the monomer containing the necessary quantity of water or glycol. The catalyst may be added all at once but preferably, the catalyst is added incrementally or continuously during the reaction period in order to better control the temperature and rate of reaction. However, it is possible to carry out the polymerization reaction in the presence of from about one part to 50 parts by weight, based on the weight of 100 parts of the monomer being polymerized, of a suitable inert organic solvent or diluent. The use of a solvent provides for more efficient mixing of the reaction materials, reduces viscosity, provides ease in maintaining exothermic control of the reaction mixture and facilitates control of monomeric concentration during polymerization. Suitable inert solvents for use in this invention are the liquid hydrocarbons, such as benzene, toluene, propane, butanes, pentanes, hexane, heptane, cyclohexane, and the like, chlorinated hydrocarbons such as chlorobenzene, carbon tetrachloride, methylene chloride, and the like.

The temperature used in the polymerization reaction is between about 0° C. and 110° C. However, it is preferred to employ temperatures in the range of about 10° C. to about 80° C. most preferably 20° C. to about 50° C., since, at these temperatures polymers having the most desirable properties are produced. It may be desirable, in many cases, to preheat or precool the contents of the reactor to the desired reaction temperature prior to the addition of catalyst or initiator. The polymerization reaction is exothermic and thus the reaction temperature is readily maintained by the controlled rate of catalyst addition. The time of the reaction will vary from about one to 10 hours.

The polymers formed by the above-described method will be of low molecular weight and will vary from fluid liquids to thick semisolids. The number average molecular weight ($M_n$) of such polymers will vary from about 350 to 10,000. The molecular weight is normally determined by vapor pressure osmometry or by gel permeation chromatography (GPC) or specified in terms of "Reduced Solution Viscosity" or "RSV" which is a point value viscosity determined as the viscosity at 25° C. of a solution of 0.4 gram of polymer dissolved in 100 ml. of dimethyl formamide containing 3% by volume of acetylacetone (expressed as deciliter per gram of dl./g.). The range of RSV corresponding to the number average molecular weight range given above will be from about 0.010 to about 0.450.

The polymerization reaction may be carried out at autogenous pressures although superatmospheric pressures of up to 10 atmospheres or more may be employed with some advantage with the more volatile monomers. Superatmospheric pressures may also be employed with those monomers and/or solvents having the requisite volatilities at reaction temperatures permitting reflux cooling of the reaction mixture.

After the reaction is completed, or at an earlier stage if desired, an alkali metal, Group IA, carbonate is added to the reaction product (polymer) to terminate the reaction and to destroy the remaining initiator or residues thereof. This is most conveniently done by washing the reaction product with a water solution of the alkali metal carbonate. These materials include sodium carbonate and bicarbonate, potassium carbonate and bicarbonate, lithium carbonate and bicarbonate and the like. The amounts used are based on the amount of initiator or catalyst employed in the polymerization and should be an amount greater than about 9 mols of alkali carbonate per mol of initiator. While amounts as high as 100 mols may be used, a useful range is from about 9 to 18 mols. If too large an excess of carbonate is used, the polymer cement or solution may have to be washed several times with water to neutralize the polymer cement and this requires unnecessary processing and adds to the cost of the product. Similarly, while large amounts of water may be used for washing the cement, for ease of handling, an amount of from about 1/10th to 3 times the volume of cement are normally adequate, and a preferred amount is from about ⅓ to an equal volume of water to cement.

The polymer product is heated with enough alkali metal carbonate at times and temperatures to provide a substantially colorless product, having a pH of about 5 to 8. This may be done by washing the polymer with the alkali metal carbonate solution at a temperature greater than about, i.e., 50° C. to about 100° C. at atmospheric pressure or at higher temperatures under pressure, for about ½ to 1 hour to destroy the initiator and residues to provide the desired product; or at temperatures and times substantially equivalent to these. Washing at a temperature about 50° C. enhances the separation of the polymer and water solution. The polymer may also be washed with water after the alkali carbonate wash.

EXAMPLES

Polymers for use in demonstrating the practice of improved process of this invention were prepared following this procedure. The polymerizations were conducted in a reactor equipped with an agitator and heating means. 562.8 weight parts of epichlorohydrin and 37.2 weight parts of ethylene glycol were charged to the reactor which was then purged with nitrogen. The reactants were heated to 30° C. 0.39 weight parts of triethyloxonium hexafluorophosphate was dissolved in 6.7 weight parts of methylene chloride. This solution was added to the reactor at the rate of about 1.42 weight parts at 5 minute intervals. The polymerization was then allowed to go to substantial completion at 30° C. in 6 hours. There was then added to the polymer 0.25 weight percent of pentaerythrityl-tetrakis-[3(3,5-di-t-butyl-4-hydroxyphenyl)-pro-pionate] as an antioxidant. The polymer was then treated by washing with 600 weight parts of water containing 1.43 g. weight parts of sodium bicarbonate, a mol ratio of 11 to one of hexafluorophosphate. The samples were washed for the times and at the temperatures shown in the Table. Some of the samples were then washed with water as shown. For comparison purposes, and to show the improvement obtained compared to use of ammonium hydroxide, 3 runs were made by washing polymer with 30% ammonium hydroxide as shown, at a molar ratio of 11 mols of ammonium hydroxide to 1 mol $PF_6$. The polymer layer was separated from the aqueous phase and dried on the rotary evaporator at 60°–130° C. under vacuum.

The polymer samples washed with sodium bicarbonate solution all were colorless, neutral and transparent, even after accelerated heat aging at 80° C. for 16 hours. When ammonium hydroxide was used for washing, the polymer developed a yellow color that darkened to amber after heating. Excellent results are obtained when the polymer is washed with a molar excess of the alkali metal bicarbonate at a temperature and time substantially equivalent to about 70° C. for about 30 minutes to one hour. This provides a clear, colorless, neutral polymer product with excellent heat aging stability.

TABLE

| Run | Washing Solution | Washing Temp. and Time | Post-Washing | Product Appearance and Acidity | Heat Aged* Product Appearance | (Gardner Color)** |
|---|---|---|---|---|---|---|
| 1 | NaHCO$_3$ | 70° C., ½ hr. | twice | clear, colorless, neutral | clear, colorless | (1) |
| 2 | NaHCO$_3$ | 70° C., 1 hr. | none | clear, colorless, neutral | clear, colorless | (1) |
| 3 | NaHCO$_3$ | 70° C., 1 hr. | twice | clear, colorless, neutral | clear, colorless | (1) |
| 4 | Na$_2$CO$_3$ | 70° C., 1 hr. | none | clear, colorless, neutral | clear, colorless | (1) |
| 5 | NH$_4$OH | 70° C., ½ hr. | twice | clear, sl. yellow, sl. acidic | clear, sl. amber | (6) |
| 6 | NH$_4$OH | 70° C., 1 hr. | none | clear yellow, almost neutral | clear, amber | (7) |
| 7 | NH$_4$OH | 70° C., 1 hr. | twice | clear amber, neutral | clear, amber | (10) |

NOTE:
*heat aged at 80° C. for 16 hr.
**

A number of other agents were tried to determine if they also could be used. Among these were dibutyldiphenyltin, dioctyltinoxide, potassium hydroxide, N(CH$_3$)$_4$OH, N(CH$_3$)$_4$Cl, and P(CH$_3$)$_4$Cl. None of these provided the desired clear, neutral, colorless heat stable polymer product.

The hydroxyl-terminated epihalohydrin polymers of the instant invention are easy to prepare and are useful as adhesives and caulking compounds. Further, the polymers of this invention are useful in chain extension reactions. When the polymers are used in chain extension reactions, the chain-extending agent can be any polyfunctional compound which will react, under appropriate conditions with hydroxyl groups. Such compounds can be di- or polyisocyanates, p-phenylene diisocyanate, 2,4-toluene diisocyanate, etc., or polyepoxides such as the diglycidyl ether of Bisphenol A, and the like. When the chain-extending agent contains more than two functional groups, the product is generally a cross-linked product. Also, a cross-linked network can be obtained by using a combination of a difunctional active chain and polymer with low molecular weight similar polyreactive compounds.

The hydroxyl-ended polymers of this invention may also be converted to useful polyester and polyamide block co-polymers by the usual polyester and polyamide forming reactions. In addition, the polymers of this invention are useful in the preparation of polyurethane foams, which may be prepared as rigid, semirigid, or elastomeric foams.

While the present invention has been described in terms of its specific embodiments, certain modifications and equivalents will be apparent to those skilled in the art and are intended to be included within the scope of the present invention, which is to be limited only by the reasonable scope of the appended claims.

I claim:

1. In a process for the manufacture of hydroxyl-terminated polymers which comprises polymerizing an epihalohydrin in the presence of from about 0.03 part to 15.0 parts by weight of water or polyol, based on 100 parts by weight of the epihalohydrin, and catalytic amounts of a trialkyl oxonium salt of an HMF$_6$ acid wherein M is an element selected from the group consisting of phosphorus, arsenic and antimony, the improvement comprising washing the polymer with an aqueous solution of an alkali metal carbonate, the amount of said metal carbonate being a molar excess over the amount of said catalyst, at a temperature of greater than 40° C., whereby there is obtained a clear, colorless, heat stable polymer having a pH of about 5 to 8.

2. A process of claim 1 wherein the epihalohydrin is epichlorohydrin.

3. A process of claim 2 wherein the polyol is an alkane diol or triol, the hydroxyl groups are primary or secondary and at least one is primary, and the polyol contains 2 to 8 carbon atoms.

4. A process of claim 3 wherein HMF$_6$ is HPF$_6$.

5. A process of claim 4 wherein said carbonate is sodium bicarbonate present in a molar ratio of greater than nine to one of catalyst.

6. A process of claim 5 wherein the polymer is washed at temperatures and times substantially equivalent to 50° C. to 100° C. and about one half to one hour to obtain a substantially neutral polymer.

7. A process of claim 6 wherein the polymer is washed at about 70° C. for about one half to one hour with about 9 to 18 mols of sodium bicarbonate to one mol of catalyst.

* * * * *